Figure 1:
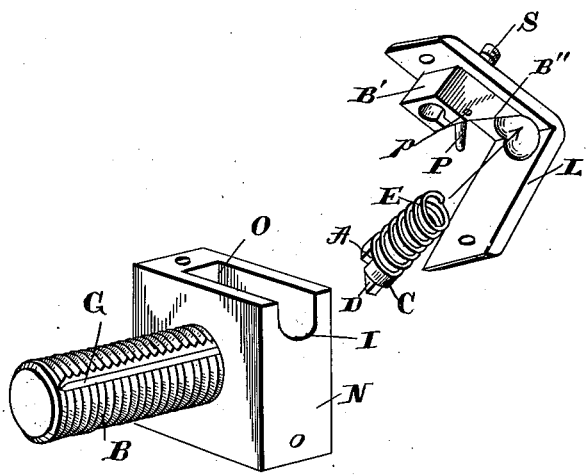

(No Model.)

G. RADEL, Jr.
NUT LOCK.

No. 594,214. Patented Nov. 23, 1897.

Witnesses:
Geo. E. Fuch.
Mark Marcy.

Inventor:
George Radel, Jr.,
by Collamer & Co., Attorneys.

UNITED STATES PATENT OFFICE.

GEORGE RADEL, JR., OF NAPOLEON, OHIO.

NUT-LOCK.

SPECIFICATION forming part of Letters Patent No. 594,214, dated November 23, 1897.

Application filed August 26, 1897. Serial No. 649,605. (No model.)

*To all whom it may concern:*

Be it known that I, GEORGE RADEL, Jr., a citizen of the United States, and a resident of Napoleon, Henry county, State of Ohio, have invented certain new and useful Improvements in Nut-Locks; and my preferred manner of carrying out the invention is set forth in the following full, clear, and exact description, terminating with claims particularly specifying the novelty.

This invention relates to nut-locks; and the object of the same is to effect certain improvements in devices of this character.

To this end the invention consists in a nut-lock constructed substantially as hereinafter more fully described and claimed, and as illustrated in the drawings, in which—

Figure 2:
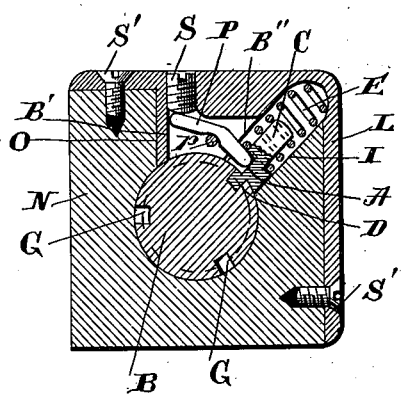

Figure 1 is a view of the parts of this nut-lock slightly separated. Fig. 2 is a cross-section through the bolt, taken through the center of the nut and its lock.

Referring to the said drawings, the letter B designates the bolt, having cut therein a number of longitudinal grooves G, although there may be but one such groove, and N is the body of the nut, which is angular on its exterior, here square. This nut is of the usual and ordinary construction, except that it has cut from its body an aperture or opening O, leading from the bolt-opening out one side and having an inclined wall I, as shown.

Coming now more particularly to the present invention, the letter L designates an L-shaped member of a size and shape to cover two adjacent faces of the square nut shown, although this piece L might be of a modified construction adapting it to a hexagonal or other shaped nut, if preferred. On the inner face of one arm of the member L is a bracket B', having its face next the corner of said member beveled, as at B'', and S is a screw passing inward through this arm of the member L at right angles to its face and thence through the bracket.

P is a pawl pivoted, as at *p*, in the bracket at one side of its screw-opening, so that the tip of the screw bears on the outer end of the pawl and when screwed inward causes its inner end to rise.

S' and S' are screws or equivalent devices for holding the member L removably (or possibly fixedly) in place upon the nut.

When the member L is applied in proper position and held in place by the screws S', the beveled face B'' of the bracket stands slightly remote from and parallel with the inclined wall I within the nut-opening, and within the radial channel thus formed I locate an expansive spring E, resting at its outer extremity within the angle of the member L. Within the inner end of this coiled spring I locate the stem of a catch C, having, as usual in such positions, a slightly-enlarged head bearing against the end of the spring, and in one side of said head is an aperture A for the reception of the inner end of the pawl P. On the face or outer end of the head is a dog D, of a shape and size to fit within the groove or grooves in the bolt B.

In operation, the parts being assembled, as shown in Fig. 2 of the drawings, the screw S is loosened or retracted until the inner end of the pawl permits the expansive spring E to press the dog of the catch into one of the grooves in the bolt, and the latter is thus locked against rotation.

When it is desired to remove or reset the nut, the screw S is tightened by means of a screw-driver or other tool, and this action rocks the pawl upon its pivot and causes its inner end to force the catch backward, thus compressing the spring E and finally withdrawing the dog D entirely out of the groove that may have been engaged, after which the nut is turned at will.

All parts of this device are of the desired sizes, shapes, and materials, and considerable change in the specific details may be made without departing from the spirit of my invention.

What is claimed as new is—

1. In a nut-lock, the combination with the bolt having a longitudinal groove, and the nut having a substantially radial channel from its bolt-opening outward; of an angular member removably secured upon the nut and closing the outer end of said channel, a spring-pressed catch within the channel and carrying a dog at its inner end normally entering the groove in the bolt, and a pivoted pawl for retracting the catch, as and for the purpose set forth.

2. In a nut-lock, the combination with a bolt having a longitudinal groove, and a nut having a channel extending from its bolt-opening outward; of a catch within the channel having a dog to enter the groove in the bolt, a detachable member upon the nut, a bracket carried thereby, and a pawl pivoted in the bracket with one extremity engaging said catch, as and for the purpose set forth.

3. In a nut-lock, the combination with a bolt having a longitudinal groove, and a nut having a channel opening from its bolt-opening; of a plate removably attached to the nut and closing said channel at its outer end, a bracket carried by said plate, a pawl pivoted between its ends within the bracket, a screw passing through the plate and bracket and bearing upon one end of said pawl, a spring in the channel beneath said plate, a catch borne inward by the spring and having an aperture receiving the tip of the pawl, and a dog on the head of the catch for entering the groove in the bolt, as and for the purpose set forth.

4. In a nut-lock, the combination with the bolt, the nut having a channel leading from its bolt-opening outward, and a substantially L-shaped member detachably secured upon the nut and closing the outer end of the channel therein; of a bracket carried by said member and having an inclined wall forming one side of the channel, a pawl pivoted within the bracket, a screw through the member against one end of the pawl, an expansive spring within the channel, and a catch forced by this spring toward the bolt and having an aperture in its head for the reception of the other end of the pawl, as and for the purpose set forth.

In testimony whereof I have hereunto subscribed my signature on this the 20th day of August, A. D. 1897.

GEORGE RADEL, JR.

Witnesses:
NELLIE BROWN,
H. L. VEY.